United States Patent [19]

Divivier et al.

[11] 4,049,777
[45] Sept. 20, 1977

[54] METHOD OF WASTE GAS TREATMENT

[75] Inventors: Rudolf Divivier, Kettwig; Gotthard Uckert, Essen, both of Germany

[73] Assignee: Didier Engineering GmbH, Essen, Germany

[21] Appl. No.: 688,302

[22] Filed: May 20, 1976

[51] Int. Cl.² ............................................. B01D 53/34
[52] U.S. Cl. .................................................... 423/239
[58] Field of Search .................. 423/239, 213.2, 213.5, 423/213.7

[56] References Cited

U.S. PATENT DOCUMENTS

| | | | |
|---|---|---|---|
| 3,008,796 | 11/1961 | Andersen et al. | 423/239 |
| 3,567,367 | 3/1971 | Kandell et al. | 423/239 |
| 3,970,739 | 7/1976 | Shiraishi et al. | 423/239 X |

FOREIGN PATENT DOCUMENTS

| | | | |
|---|---|---|---|
| 1,504,331 | 10/1967 | France | 423/239 |
| 2,411,888 | 9/1974 | Germany | 423/239 |

*Primary Examiner*—G. O. Peters
*Attorney, Agent, or Firm*—Wenderoth, Lind & Ponack

[57] ABSTRACT

Waste gas, for example exhaust gas from an adipic acid production process, containing nitrogen oxides and a high proportion of oxygen and/or oxygen compounds is treated to remove the nitrogen oxides by reducing the nitrogen oxides with ammonia at an elevated temperature in the presence of a catalyst comprising an iron oxide and a chromium oxide.

11 Claims, 1 Drawing Figure

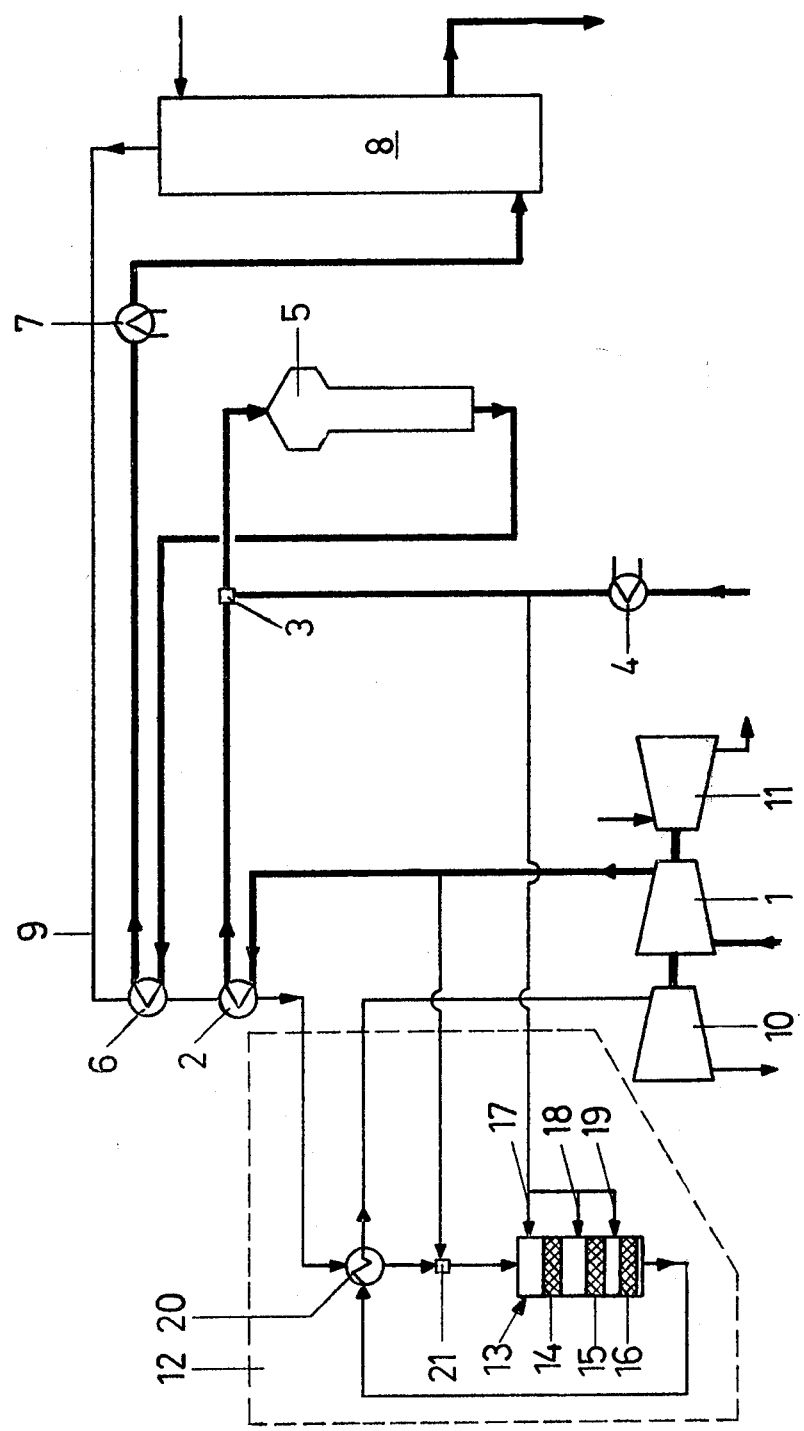

METHOD OF WASTE GAS TREATMENT

The invention relates to a method of waste gas treatment and in particular the removal of nitrogen oxides ($NO_x$), i.e. NO and $NO_2$, from exhaust gases containing a high proportion of oxygen and/or oxygen compounds, such as dinitrogen oxide, particularly from the waste gases of a nitration plant or plant using nitric acid as an oxidant, such as an adipic acid plant.

In addition to a major proportion of nitrogen waste gases of an adipic acid plant contain large volumes of nitrogen oxides. Concentrations of nitrogen oxides as high as 10,000 p.p.m. by volume may occur. Exhaust gases of such a kind must not be discharged into the atmosphere because they would create a considerable pollution hazard.

The waste gases from adipic acid plants not only contain considerable volumes of nitrogen oxides ($NO_x$), but also have high contents of oxygen and dinitrogen oxide, the concentrations of which are usually in the neighborhood of for instance 16% by volume.

German Pat. No. 1,259,298 discloses a process wherein the nitrogen oxides are reduced with ammonia. One uses here a catalyst that consists of iron oxides and chromium oxides. It is known in the art that this process can be applied economically only in the case where the exhaust gas contains a small amount of oxygen, which may lead to a reduction-counteracting oxidation.

It is an object of the present invention to provide a method which can be economically used in removing nitrogen oxides, even when the composition of the waste gas is one favoring oxidation.

It has now been found that, surprisingly, a method in which the nitrogen oxides are reduced by ammonia at elevated temperature in the presence of a catalyst, the latter being a mixed oxide comprising an oxide of the iron group and an oxide of the chromium group, leads to a reduction of the content of nitrogen oxides, leaving concentrations of for instance only 100 p.p.m.

The reference to "oxide of the iron group" and "oxide of the chromium group" arises as a result of the fact that iron and chromium have several valences. Any mixture of oxides of these two metals can be used in the catalyst, although the catalyst preferably contains a mixture of ferric oxide ($Fe_2O_3$) and chromic oxide ($Cr_2O_3$).

The catalyst preferably contains a major proportion, e.g. at least 85% by weight of the iron oxide, and a minor proportion, e.g. at least 10%, by weight of the chromium oxide.

The waste gases subjected to treatment in accordance with the present invention generally contain 2,500–10,000 (or somewhat more specifically, 5,000–10,000) p.p.m. by volume of the nitrogen oxide or mixture of nitrogen oxides. The process of this invention results in lowering the concentration of the nitrogen oxides to a value of less than 200 p.p.m., or a value no greater than 100 p.p.m., or even a value of less than 50 p.p.m.

As indicated above, the waste gases subjected to treatment in accordance with the present invention also contain a high proportion of oxygen and/or oxygen compounds. The proportion of oxygen in the waste gases is at least 10% by volume, and generally ranges from 10 to 16% by volume, and the proportion of oxygen compounds (not including the nitrogen oxides, i.e. NO and/or $NO_2$), e.g. $N_2O$, is at least 12% by volume and generally ranges from 12 to 16% by volume.

The reduction with ammonia is carried out at an elevated temperature. Such temperature should not be less than 260° C. Generally, the upper limit for the temperature is about 350° C.

The amount of ammonia employed for reduction of the nitrogen oxides depends on the amount of nitrogen oxides, to be reduced, present in the waste gases, and the level to which the amount of nitrogen oxides is to be lowered. Generally, at least a stoichiometric amount of ammonia is employed, based on the amount of nitrogen oxides present in the waste gases to be subjected to treatment in accordance with the present invention.

With advantage the catalyst is divided into a plurality of stages and proportional branch streams of ammonia are introduced into the chamber preceding the catalyst stages. This can be seen from the drawing, which represents a schematic illustration of the process of this invention.

The advantages afforded by the invention reside not only in that nitrogen oxides can be removed from exhaust gases which have a pronounced oxidizing character, but more specifically in that, contrary to expectations, the space velocity can be raised. In other words, the volume of catalyst needed for treating a given waste gas stream is less than would have been predicted. The result is a saving in cost because a required throughput of waste gas calls for a smaller volume of catalyst and consequently also for a smaller capacity reactor.

The invention may be put into practice in various ways, and one specific embodiment will be described by way of example with reference to the accompanying drawing.

The drawing represents a nitric acid plant, the feed-water and steam cycles being omitted. An air compressor 1 compresses air and pumps it through a heat exchanger 2 into a mixer 3 which is also supplied with ammonia gas from an evaporator 4. The ammonia and air mixture enters a converter 5 where it is oxidized to nitrogen oxides in a conventional manner. The reduction mixture is then passed through a heat exchanged 6 and a gas cooler 7 before it enters an absorption tower 8 where the water required for the process is also added. The product collects in the bottom of the absorber.

The waste gas charged with the residual nitrogen oxide leaves the absorber overhead and is taken through a pipe 9 and the two heat exchangers 6 and 2 for expansion in a gas turbine 10 before being discharged into the atmosphere from a waste gas stack.

In a conventional nitric acid plant the waste gas is taken directly from the heat exchanger 2 to the gas turbine 10 wherein it is expanded before being exhausted into the stack. The gas turbine 10 generates part of the energy needed for driving the air compressor 1. The remainder of the energy is provided by a steam turbine 11.

The proposed apparatus 12 for reducing the nitrogen oxides in the waste gas is interposed between the heat exchanger 2 and the gas turbine 10. It comprises a reactor 13 which contains the catalyst disposed in for example three beds 14, 15 and 16 arranged in tiers. Pipes 17, 18, and 19 discharge ammonia vapor into the spaces above the catalyst beds 14, 15 and 16. The entry into the reactor 13 is connected to the heater exchanger 2 through an interposed further heat exchanger 20 and possibly a supplementary burner 21. The supplementary burner 21 may be operated with a mixture of air and natural gas. The exit side of the reactor 13 is connected via heat exchanger 20 to the expanding gas turbine 10.

EXAMPLE 1

A stream of waste gas leaves the heat exchanger 2 in an amount of 20,000 m³ (S.T.P.) per hour, its temperature being 180° C and its pressure 2.9 atm.abs. The $NO_x$-concentration was 2500 p.p.m. This stream is heated in heat exchanger 20 to 270° C. The supplementary burner 21 is used to raise the temperature up to 320° C. About 42 kg/h of ammonia gas are now introduced into the reactor 13. The division between the three pipes 17, 18 and 19 is in the proportions of 70 : 20 : 10. The proportions by volume of the catalyst in the beds 14, 15 and 16 are 15 : 20 : 65. The reaction between the nitrogen oxides and the ammonia is exothermic. The resultant heat is transferred in heat exchanger 20 to the waste gas from heat exchanger 2. The gas stream leaving the heat exchanger 20 amounts to 20,500 m³ (S.T.P.) per hour, its temperature being 180° C and its pressure 2.8 atm.abs.

The $NO_x$-concentration in the gas leaving reactor 13 is less than 200 p.p.m. This gas stream is expanded in a gas turbine, generating power, and then discharged through the stack.

The apparatus 12 is very flexible in operation and can be readily adapted to the conditions applying to the waste gas generated in a nitric acid plant. For instance, the supplementary burner 21 can be dispensed with if the waste gas is at a more elevated temperature. In the illustrated example the catalyst might also be divided between two beds. Moreover, the arrangement permits waste gases to be purified which contain a substantially higher or lower concentration of nitrogen oxides than the gas in the above described illustrative example.

The catalyst is a mixed oxide of iron oxide and chromium oxide as described below in Example 2 and it is provided in granular form.

EXAMPLE 2

In an experimental plant 5,000 liters (S.T.P.)/h were passed through a reactor. The waste gas from the adipic acid plant had the following approximate composition:
$O_2$; 16; % by volume
$H_2$; 2.4; % by volume
$N_2$; 67; % by volume
$NO_2$; 0.24% by volume
NO; 0.36; % by volume
$CO_2$; 0.3; % by volume
$N_2O$; 16; % by volume This represents an overall nitrogen oxide concentration of 6,000 p.p.m. by volume, neglecting the $N_2O$ which is entirely harmless. The high proportion of oxygen and dinitrogen oxide ($N_2O$) is striking.

Before being introduced into the reactor the waste gas was heated to a temperature of about 265° C. Three catalyst beds of different depths as described in Example 1 were provided inside the reactor. Branch streams of ammonia, which were proportional to the volume of catalyst in each bed were sent through each of the beds.

The catalyst consisted of
85% FE(III) oxide
10% Cr(III) oxide
2% Cr(VI) oxide
with the balance (3%) being an admixture of silica, alkalies and alkaline earths. Preferably, in the present invention, the chromic oxide is present in an amount greater than the amount of the chromium trioxide, e.g. in a weight ratio of chromic oxide to chromium trioxide of 5:1; and the weight ratio of iron oxide to chromium oxide is at least 7:1.

An NO, $NO_2$-combined content of 100 p.p.m. by volume was measured at the reactor exit. The maximum space velocity of the catalyst was found to be 3,000 (m³ (S.T.P.)/h)/(m³). This value is surprisingly good. The predicted space velocity would have been about 1,000 (m³ (S.T.P.)/h)/(m³).

Other tests were then performed on a waste gas having NO, $NO_2$-combined concentrations up to 10,000 p.p.m. by volume. These waste gases were heated to temperatures from 260° C to 310° C. The NO, $NO_2$-combined concentrations at the reactor exit were found to be in the order of 200 p.p.m. by volume. The maximum space velocity rose to as high as 5,000 (m³ (S.T.P.)/h)/(m³).

This rise in space velocity can be explained by assuming that the oxygen and the dinitrogen oxide unexpectedly cooperate in a direction favoring the reduction.

We claim:

1. A method of removing nitrogen oxides from a feed stock containing at least 10% by volume of oxygen and/or at least 12% by volume of oxygen compounds other than the nitrogen oxides, which comprises providing at least two separate beds of a catalyst comprising at least one oxide of the iron group and at least one oxide of the chromium group, and passing the feed stock sequentially through the catalyst beds while simultaneously introducing ammonia into the feed stock prior to passage of the feed stock through each catalyst bed, thus causing the nitrogen oxides to undergo a reduction reaction, said reduction reaction being carried out at a temperature between 260° C and 350° C.

2. A method according to claim 1, in which the catalyst comprises ferric oxide and chromic oxide.

3. A method according to claim 1, in which the feed stock is heated to a temperature between 260° C and 310° C.

4. A method according to claim 1, in which the feed stock contains up to 10,000 volume parts per million of NO, $NO_2$ or a mixture thereof, and a major proportion of nitrogen.

5. A method according to claim 4, in which the feed stock contains 5,000 to 10,000 volume parts per million of NO, $NO_2$ or a mixture thereof.

6. A method according to claim 5, in which the feed stock contains about 16% by volume of oxygen.

7. A method according to claim 1, in which the catalyst is a mixture of a major proportion by weight of an iron oxide and a minor proportion by weight of at least one chromium oxide.

8. A method according to claim 1, in which the catalyst comprises ferric oxide, chromic oxide and chromium trioxide.

9. A method according to claim 8, in which the chromic oxide is present in an amount greater than the amount of the chromium trioxide.

10. A method according to claim 9, in which the ratio by weight of chromic oxide to chromium trioxide is 5:1.

11. A method according to claim 7, in which the ratio by weight of the iron oxide to the chromium oxide is at least 7:1.

* * * * *